United States Patent [19]

Crosno

[11] 3,758,711

[45] Sept. 11, 1973

[54] TIME BASE ERROR CORRECTION SYSTEM INCLUDING ELECTRONICALLY VARIABLE DELAY LINE FOR VIDEO REPRODUCER AND/OR RECORDER

[75] Inventor: Philip M. Crosno, Saratoga, Calif.

[73] Assignee: Cartridge Television, Inc., San Jose, Calif.

[22] Filed: Mar. 9, 1972

[21] Appl. No.: 233,062

[52] U.S. Cl. .................... 178/6.6 TC, 178/69.5 DC
[51] Int. Cl. .................... H04n 1/22, H04n 5/78
[58] Field of Search .................... 178/6.6 TC, 6.6 A, 178/6.5, 69.5 DC; 340/174.1 A; 179/100.2 K

[56] References Cited

UNITED STATES PATENTS

| | | | |
|---|---|---|---|
| 3,681,522 | 8/1972 | Tanabe | 178/6.6 TC |
| 3,674,920 | 7/1972 | Faroudja | 178/6.6 TC |
| 3,676,583 | 7/1972 | Morita | 178/6.6 TC |
| 3,371,158 | 2/1968 | Tanaka et al. | 178/6.6 TC |
| 3,235,662 | 2/1966 | Bopp | 178/6.6 TC |
| 3,409,736 | 11/1968 | Hurst et al. | 178/6.6 TC |
| 3,202,769 | 8/1965 | Coleman, Jr. | 178/6.6 TC |

*Primary Examiner*—Vincent P. Canney
*Assistant Examiner*—Alfred H. Eddleman
*Attorney*—Charles M. Hogan

[57] ABSTRACT

Disclosed herein is a system for compensating for time base errors existing in helical scan video recorders. On playback stripped horizontal synchronizing signals and the synchronizing signal of a simulated television receiver horizontal scanning system are applied to a phase detector. The resultant control signal is filtered and utilized to control the horizontal oscillator in the simulated horizontal scanning system. The control signal is also used to control the frequency changing circuitry of a surface wave dispersive delay line in which the magnitude of delay depends on frequency. The surface wave delay line is inserted between the video output of a recorder-reproducer and the input of a television receiver monitor.

3 Claims, 2 Drawing Figures

TIME BASE ERROR CORRECTION SYSTEM INCLUDING ELECTRONICALLY VARIABLE DELAY LINE FOR VIDEO REPRODUCER AND/OR RECORDER

BACKGROUND OF THE INVENTION

Various techniques have been exploited in an endeavor to eliminate time base errors which show up on playback of video reproducing and/or recording systems. In helical video tape recorders, for example, time base errors are generated in that the recordings are discrete units of information. Physical displacements existing between the end of one field and the start of the next introduce discontinuities in information flow. The resultant timing errors manifest themselves as phase errors in the horizontal synchronizing signal output of the reproducer.

Various endeavors to eliminate time base error have been made, for example, those disclosed in the following United States Patents:

Newell —No. 3,141,926
Bopp & Krause —No. 3,238,300
Bopp & Krause —No. 3,384,707
Gunther —No. 3,421,951
Dillenburger & Krause—No. 3,505,473
Krause —No. 3,614,303

An object of the invention is to provide an improved time base error compensation system in which a simulated horizontal scanning system of a television receiver is utilized as the comparative are applied to a phase detector.

For a better understanding of the invention, together with other and further objects, advantages and capabilities thereof, reference is made to the following description of the accompanying drawing.

DESCRIPTION OF THE INVENTION

Figure 1:
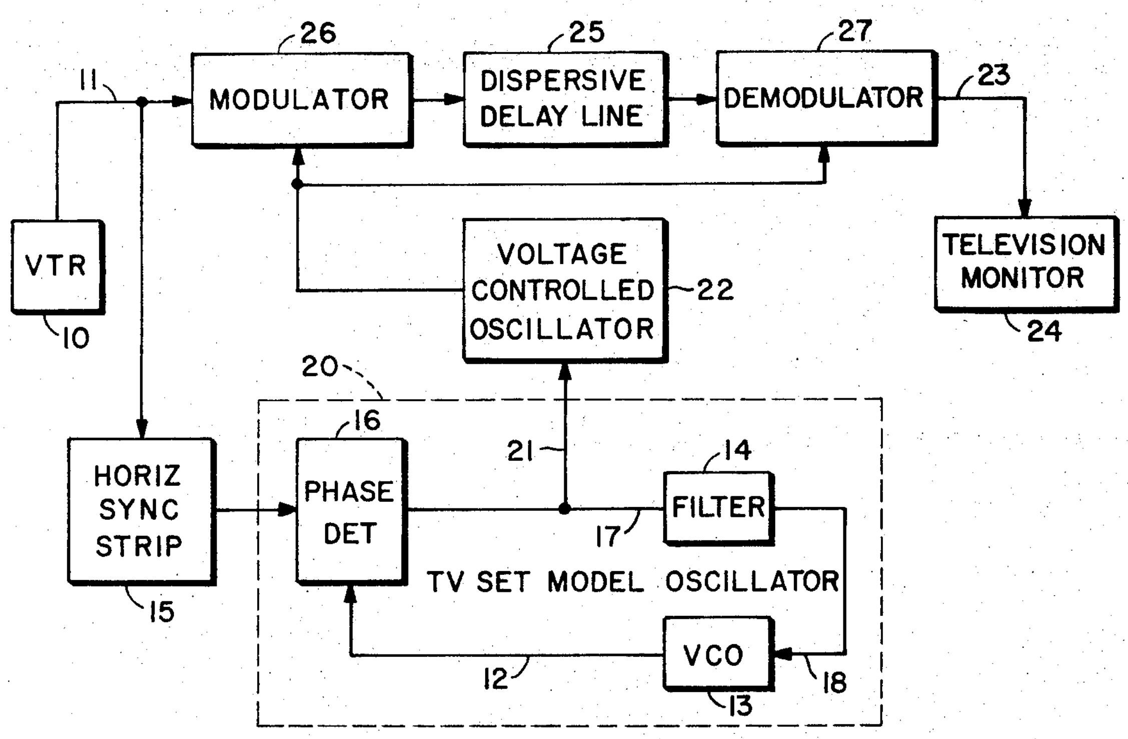
FIG. 1 is a schematic diagram generally in block form of a time base error compensating system in accordance with the invention.

The numeral 10 designates in block form a video tape recorder-reproducing system of the helical scan type and line 11 designates the video output thereof. The signals from this output include horizontal synchronizing components and these are subject to time base errors which require elimination. In accordance with the invention I provide an error free reference in the form of horizontal synchronizing signals appearing on line 12. These are produced by a horizontal oscillator 13 which is controlled as to frequency by an integrator 14. The integrator 14 and the oscillator 13 simulate the helical scanning system of the television receiver into which the output of the video reproducing system 10 is fed.

The simultated horizontal scanning system 20 is locked onto the horizontal sync signals from separator 15. It will be understood that the analog eror output of phase detector 16 appears on line 17 and is integrated by filter 14. The output 18 of filter 14 is coupled to the local oscillator 13 for control purposes. Output 17 is coupled by line 21 to the input of a second voltage controlled oscillator 22.

Oscillator 22 controls the delay in the video signal path which includes output 11 of the video tape reproducer and video input 23 to the television receiver readout 24. That is, oscillator 22 is so arranged that it varies the frequency of the video signals traversing delay line 25, which delay line is included in the video path.

In one embodiment of the invention oscillator 22 is variable to produce a carrier frequency of 10 to 100 microhertz. The frequency of the video signals at 11 is 0 to 6 megahertz. The carrier frequency from oscillator 22 is applied to a modulating mixer 26 and also to a demodulating mixer 27, the mixers 26 and 27 being coupled to the input and output respectively, of the dispersive delay line.

The analog error signal on line 21 controls the frequency of oscillator 22. That oscillator heterodynes the input to line 25 up to a high frequency and the demodulator heterodynes the output of the dispersive delay line down to video frequency of 0 to 6 megahertz.

In other words, the input signal to mixer 26 is a composite color television video signal. The output signal applied to the readout 24 is similar to the input signal, but delayed in time. The magnitude of the delay is controlled by changing the carrier frequency output of oscillator 22, utilizing the analog voltage on line 21.

The following parameters are preferred, in the FIG. 1 embodiment:

carrier frequency $f_c$: 10 to 100 MHz range delay scale factor $f_c/t(e_{in}$ to $e_{out})$: MHz/1$\mu$sec to 0.2MHz/1$\mu$sec demodulated frequency response: DC to 6MHz demodulated phase response: the variation in group delay from 1MHz to 5.5MHz shall be less than 0.1$\mu$sec.

insertion loss $e_{in}/e_{out}$: 20 to 30 dB (the possibility of overcoming insertion loss with an amplifier at the carrier frequency $f_c$ should be considered).

delay range: ± 3$\mu$sec. minimum, ± 12$\mu$sec ideal demodulated signal-to-noise: 50 dB demodulated interference pattern: 46dB.

Dispersive delay lines of the surface wave, signal processing, filter type are well known to those of skill in the art. In lines of that type the magnitude of delay is a function of the frequency of the signals passing through the line.

Figure 2:
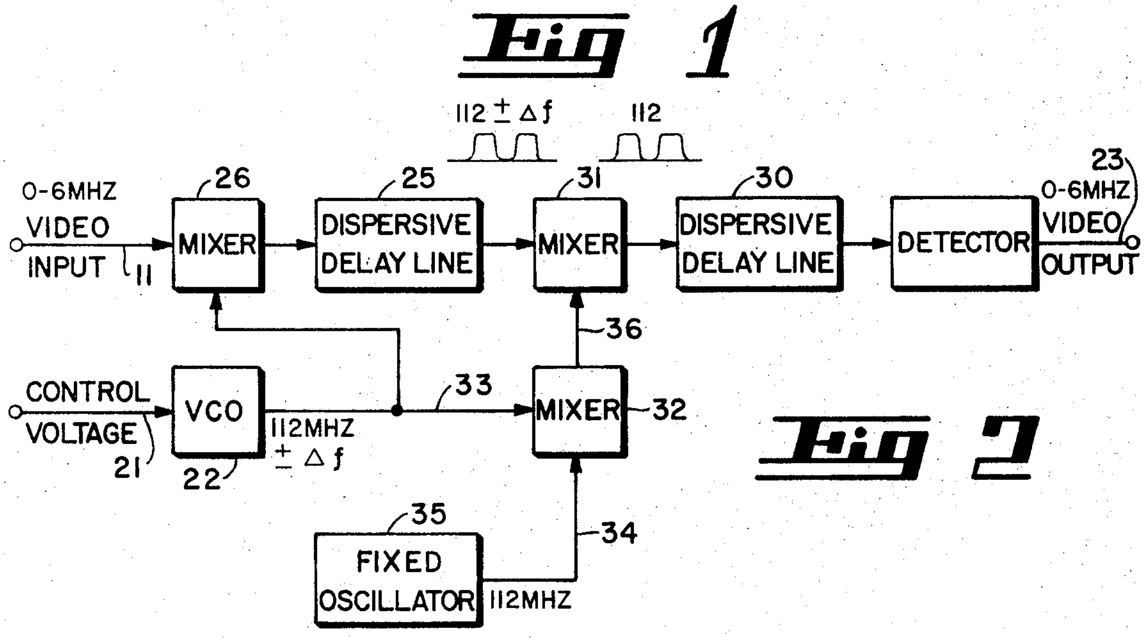
FIG. 2 is a modified form of such system.

The FIG. 2 embodiment incorporates a number of elements similar to those of the FIG. 1 embodiment, such as the video input 11, the modulator 26, and the delay line 25. The FIG. 2 embodiment has provisions for correcting the band compression which is caused by delay line 25. This is accomplished by an additional delay line 30 which is inserted in the video path at a high frequency level. The output of line 25 is applied to a mixer 31 and heterodyned against substantially a double frequency carrier, so that the carrier output of mixer 31, appearing at the input of line 30, approximates the carrier frequency applied to mixer 31. The control voltage of line 21 is utilized to control the frequency of a voltage controlled oscillator 22. Oscillator 22 directly controls the frequency output of mixer 26 but it controls the frequency output of mixer 31 indirectly, via an additional mixer 32 which intermodulates the signals on output 33 of oscillator 22 and on output 34 of a fixed oscillator 35 in order to provide the desired double frequency carrier on line 36.

In the FIG. 2 embodiment delay line 25 causes some undesired pulse compression which is compensated for by the pulse expander action of delay line 30.

The control voltage on line 21 of FIG. 2 is produced in the same manner as in FIG. 1, i.e., by units such as those numbered 15 and 20.

While there has been shown and described what is at present believed to be the preferred embodiment of the invention, it will be understood that various changes and modifications made be made without departing from the true scope of the invention as described in the appended claims.

Having disclosed my invention, I claim:

1. A circuit for correcting time base errors appearing in the output of a video tape reproducing device, which output is adapted to be applied in a video signal path to a television receiver readout, said circuit comprising:

a surface wave dispersive delay line inserted in said path, means for deriving a signal which is a measure of said errors, and means for utilizing said signal to vary the frequency of the video signals traversing said delay line, thereby to correct said errors.

2. A circuit for correcting time base errors appearing in the output of a video tape reproducing device, which output is adapted to be applied in a video signal path to a television receiver readout having a horizontal scanning system, said circuit comprising:

means for stripping horizontal synchronizing signals from the output of said reproducing device, a local oscillator for producing pulse signals, phase detecting means adapted to have applied thereto the stripped horizontal synchronizing signals and the pulse signal output of said local oscillator to produce a resultant analog error signal, means interposed between said phase detecting means and said local oscillator for filtering said analog error signal and applying it to said local oscillator, the ensemble of said local oscillator and said detecting means and said filtering means simulating in parameters and operation the automatic frequency control portion of the horizontal scanning system of said television receiver readout, variable delay means in said video signal path, said delay means being a surface wave dispersive delay line in which the magnitude of the delay depends on the frequency of the carrier signals passing therethrough, and means controlled by said analog error signal for varying said frequency.

3. The combination in accordance with claim 2 in which the last-mentioned means comprises:

a modulator intercoupled between the video tape reproducing device and the surface wave dispersive delay line, a demodulator intercoupling the delay line and said television receiver readout, and a second oscillator of the voltage controlled type, having an input coupled to the filtering means and outputs coupled to the modulator and demodulator, for elevating the frequency of the video signals passing through the delay line and depressing the frequency of the video signals departing from the delay line.

* * * * *